(12) United States Patent
Ono et al.

(10) Patent No.: US 6,970,655 B2
(45) Date of Patent: Nov. 29, 2005

(54) METHOD AND CIRCUIT FOR GENERATING SINGLE-SIDEBAND OPTICAL SIGNAL

(75) Inventors: Takashi Ono, Tokyo (JP); Shinichi Shimotsu, Tokyo (JP); Masayuki Izutsu, Koganei (JP)

(73) Assignees: NEC Corporation, Tokyo (JP); Sumitomo Osaka Cement Co., Ltd., Tokyo (JP); National Institute of Information and Communications Technology, Tokyo (JP)

( * ) Notice: Subject to any disclaimer, the term of this patent is extended or adjusted under 35 U.S.C. 154(b) by 649 days.

(21) Appl. No.: 10/084,968

(22) Filed: Mar. 1, 2002

(65) Prior Publication Data

US 2002/0171900 A1 Nov. 21, 2002

(30) Foreign Application Priority Data

Mar. 2, 2001 (JP) .............................. 2001-057788

(51) Int. Cl.⁷ .......................................... H04B 10/04
(52) U.S. Cl. ..................... 398/186; 398/196
(58) Field of Search ................ 398/183, 186, 398/188, 196

(56) References Cited

U.S. PATENT DOCUMENTS

| | | | | |
|---|---|---|---|---|
| 5,301,058 A | * | 4/1994 | Olshansky | 398/194 |
| 6,459,519 B1 | * | 10/2002 | Sasai et al. | 398/183 |
| 6,525,857 B1 | * | 2/2003 | Way et al. | 398/192 |
| 6,661,976 B1 | * | 12/2003 | Gnauck et al. | 398/183 |
| 6,766,116 B2 | * | 7/2004 | Webb | 398/196 |
| 2002/0076132 A1 | * | 6/2002 | Peral et al. | 385/15 |

FOREIGN PATENT DOCUMENTS

| | | |
|---|---|---|
| JP | 61-13231 A | 1/1986 |
| JP | 11-249094 A | 9/1999 |

OTHER PUBLICATIONS

S. Shimotsu et al., "LiNbO₃ Optical Single-Sideband Modulator", 25th Optical Fiber Communication Conference, Mar. 2000, PD16-1-PD16-4.

* cited by examiner

Primary Examiner—Jason Chan
Assistant Examiner—Christina Y Leung
(74) Attorney, Agent, or Firm—Sughrue Mion, PLLC

(57) ABSTRACT

The present invention relates to a method for generating a single-sideband optical signal. According to the method, as data signals having a 90-degree phase difference with respect to input data signals, which are NRZ signals at 10 Gb/s, 0.5-bit delay data signals are generated by a 0.5-bit delay circuit for obtaining a delay corresponding to π/2 of the bit period of the input data signal. An SSB optical signal produced from the data signals and the 0.5-bit delay data signals is generated through an optical filter. Further, to eliminate a residual intensity-modulated component, the generated SSB optical signal is fed back to appropriately adjust the center frequency of the optical filter. The carrier output frequency of a semiconductor laser can be adjusted instead of the center frequency of the optical filter. When an RZ signal is used as an input data signal, a 0.25-bit delay circuit is used.

14 Claims, 11 Drawing Sheets

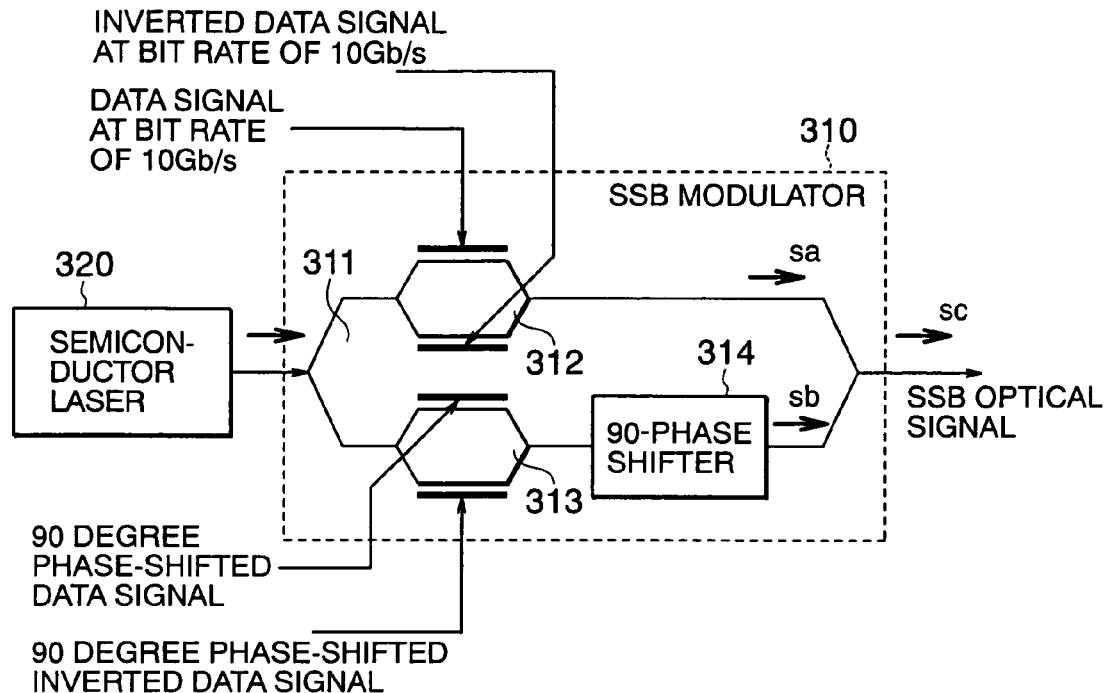
FIG. 3 RELATED ART
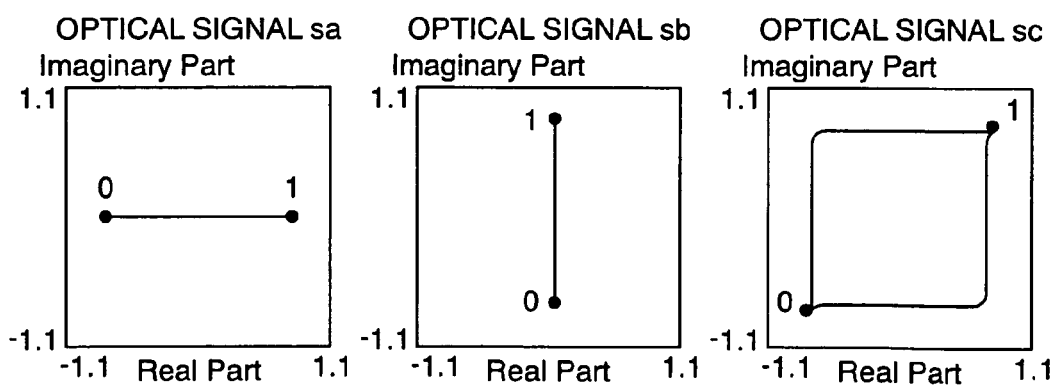
FIG. 4A RELATED ART
FIG. 4B RELATED ART
FIG. 4C RELATED ART OPTICAL FILTER CENTER FREQUENCY (+1.9 GHz)

OPTICAL FILTER CENTER FREQUENCY (+4.4GHz)

OPTICAL FILTER CENTER FREQUENCY (+6.9 GHz)

OPTICAL SPECTRUM

PHASOR DIAGRAM

HOMODYNE DETECTION
RECEPTION WAVEFORMS

METHOD AND CIRCUIT FOR GENERATING SINGLE-SIDEBAND OPTICAL SIGNAL

BACKGROUND OF THE INVENTION

1. Field of the Invention

The present invention relates to a method and circuit for generating a single-sideband optical signal in optical fiber communication employing a single-sideband (SSB) optical modulation system. More particularly, the present invention relates to a method and circuit for generating a single-sideband optical signal without necessitating a 90-degree hybrid circuit.

2. Description of the Related Art

To increase the transmission capacity of an optical-fiber communication system, the use of wavelength division multiplexing (WDM) together with the realization of higher bit rates is effective. Following several WDM optical transmission systems have recently been put into practical use. According to one of these systems, an optical signal having a bit rate of 10 Gb/s per wavelength is wavelength-multiplexed at a frequency interval of 50 GHz (corresponding to a wavelength interval of 0.4 nm in a waveband of 1.55 $\mu$m), and the resultant optical signal is transmitted.

For higher density multiplexing, an optical transmitter using a single-sideband (SSB) modulation system can be used. According to this system, the spectral width of signal is narrow. The SSB modulation system is one technology generally used in the radio communication field. When the SSB modulation system is applied to optical communication, there is a lot of similarity between the configuration of the optical transmitter in optical communication and that in radio communication. Recent optical modulators use a circuit including a Mach-Zehnder interferometer, which can shift the phase up to 90 degrees due to bias adjustment.

This type of method or circuit for generating a single-sideband optical signal includes, for example, an optical signal amplifier and an optical transmission system disclosed in Japanese Unexamined Patent Publication No. S61-13231. As an integrated optical device of the amplifier, for example, an SSB modulator 110 shown in FIG. 1 is used. In the SSB modulator 110, an optical waveguide is disposed on a lithium niobate (LiNbO$_3$) substrate to form a Mach-Zehnder interferometer. An appropriate electric field is applied to electrodes 111 to 113 on the waveguide to generate an SSB optical signal.

As shown in the diagram, continuous wave (CW) light emitted from a semiconductor laser 120 is split into two carrier waves. For one carrier wave, a 90-degree phase-shifting bias is applied to the electrode 111 to shift the phase of light serving as the carrier wave by 90 degrees ($\pi/2$). After that, a microwave signal in an intermediate frequency (IF) band is applied to the electrode 112 to modulate the phase. For the other carrier wave, the phase of the microwave signal is shifted by 90 degrees through a 90-degree phase shifter 114 functioning as a 90-degree hybrid circuit. The resultant microwave signal is then applied to the electrode 113 to modulate the phase of the other carrier wave. Combining the individual phase-modulated carrier waves can produce an SSB optical signal as an output.

As another case, an SSB modulator 210 shown in FIG. 2 is cited. This modulator was disclosed by Shimozu et al. in the 25th Optical Fiber Communication Conference (OFC 2000 conference) in March 2000. The SSB modulator 210 is formed on a lithium niobate substrate. The SSB modulator 210 includes a sideband generating section 211 and a sideband suppressing section 212. The sideband generating section 211 is constructed in such a manner that Mach-Zehnder interferometers 214 and 215 are integrated in both arms of a Mach-Zehnder interferometer 213.

The Mach-Zehnder interferometer 214 is driven by a single frequency signal of 10 GHz and the inverted signal thereof. The other Mach-Zehnder interferometer 215 is driven by a signal having a 90-degree phase difference with respect to the single frequency signal of 10 GHz and the inverted signal thereof.

In other words, the Mach-Zehnder interferometer 213 drives the two Mach-Zehnder interferometers 214 and 215 on both arms with the above-mentioned 10-GHz single frequency signals having the appropriate phase difference, thereby generating an SSB optical signal. The Mach-Zehnder interferometer 213 performs push-pull modulation on the two Mach-Zehnder interferometers in both arms, thus performing 0-$\pi$ phase modulation without causing undesirable chirping.

The SSB modulator 210 adjusts a bias applied to either port or both ports of each of the Mach-Zehnder interferometers 214 and 215, thereby causing a phase difference. The phase difference between the carrier waves of the optical signals in both arms is set to 90 degrees. That is, a phase difference can still be generated even when a dedicated electrode for 90-degree phase shifting is not disposed as described with reference to FIG. 1.

As another example, for example, a waveguide type optical modulator and an optical modulating method disclosed in Japanese Unexamined Patent Application Publication No. H11-249094 are cited (not shown as any diagram). According to this method, a carrier wave having a frequency $\omega_0$ is SSB-modulated to generate an SSB optical signal in a manner similar to the SSB modulator described with reference to FIG. 2. An optical signal having a frequency $\omega_1$ different from the above frequency is combined with the above SSB optical signal. The resultant optical signal is transmitted According to this method, the carrier wave having the frequency $\omega_0$ is converted into two carrier waves (frequencies $\omega_1$ and $\omega_2$). The optical signal having the frequency ($\omega_1$) is mixed to perform cancellation, and therefore, only the frequency ($\omega_2$) remains.

The above-mentioned conventional methods and circuits for generating a single-sideband optical signal have the following disadvantages.

First, for microwaves, an SSB optical signal cannot be generated using a wideband baseband signal, which is generally used in optical communication.

The reason is as follows. The 90-degree hybrid circuit is used for 90-degree phase shifting of microwaves. However, the 90-degree hybrid circuit does not operate over a wide frequency band from a low frequency close to DC up to a high frequency.

Second, it is difficult to realize a chirpless optical phase modulator. If such modulator can be realized, it prevents the realization of high-density multiplexing.

The reason is as follows. Non-linearity is caused due to the voltage versus optical output sinusoidal characteristics of the Mach-Zehnder interferometer. An excess high-frequency component remains in the SSB optical signal due to the non-linearity.

The above problems will now be described with reference to FIGS. 3 to 5.

Referring to FIG. 3, an SSB modulator 310 used in this case is the same type as the sideband generating section in FIG. 2. Namely, the SSB modulator 310 is constructed in such a manner that Mach-Zehnder interferometers 312 and 313 are integrated in both arms of a Mach-Zehnder interferometer 311. A 90-degree phase shifter 314 is connected in series with the Mach-Zehnder interferometer 313. The SSB modulator 310 performs combination to generate an SSB optical signal. To obtain data in this instance, an NRZ (Non Return to Zero) data signal at a bit rate of 10 Gb/s is used as a data signal to drive the SSB modulator 310.

Accordingly, the Mach-Zehnder interferometer 312 is driven by the data signal at 10 Gb/s and the inverted signal thereof, thereby generating an optical signal sa. The other Mach-Zehnder interferometer 313 is driven by a signal having a 90-degree phase difference with respect to the data signal at 10 Gb/s and the inverted signal thereof. An output of the Mach-Zehnder interferometer 313 is supplied to the 90-degree phase shifter 314 to become an SSB optical signal sb. The optical signal sa and the optical signal sb are combined into an SSB optical signal sc.

Subsequently, the states of the individual optical signals sa, sb, and sc shown in phasor diagrams will now be described with reference to FIGS. 4A to 4C. The phasor diagrams show the amplitude and the phase of light at each time by a vector. The amplitude indicates the distance from origin and the phase denotes the rotation angle from the X axis. In the case of the modulated optical signal, since the position of the vector moves with the passage of time, as shown in FIGS. 4A to 4C, the phasor diagram is useful to intuitively understand the motion or path of the modulated optical signal.

The Mach-Zehnder interferometer 312 is driven in a push-pull manner by a data signal having the same amplitude as that of a half-wavelength voltage (V $\pi$) and the inverted data signal thereof. In this instance, both a mark (1) and a space (0) of the data signal are allowed to match the peak of the output characteristics of the Mach-Zehnder interferometer 312, so that a 0-$\pi$ phase-modulated optical signal can be obtained, as shown in the figure. Similarly, the other Mach-Zehnder interferometer 313 is driven in push-pull manner by a 90-degree phase-shifted delayed data signal and a 90-degree phase-shifted delayed inverted data signal, thereby obtaining phase-modulated optical signal. The above two phase-modulated optical signals are combined so as to produce a 90-degree optical phase difference, so that the SSB optical signal sc can be obtained. The following is clear from the phasor diagrams. When the vector travels between the mark (1) and the space (0), the vector moves due to phase rotation without returning to origin. The above characteristics are peculiar to the SSB optical signal.

FIGS. 5A and 5B show the optical spectrum and the homodyne detection reception waveforms of the SSB optical signal sc.

It can be understood from the optical spectrum that low frequency components are suppressed compared with the carrier wave component and the carrier frequency. The SSB optical signal is combined with carrier wave light having the same frequency as that of the carrier wave. Then, when the resultant light is received by a photoreceiver, the data signal can be demodulated by homodyne detection. As mentioned above, in the case where the carrier wave light is generated in a receiver and is then combined with the SSB optical signal and the resultant light is received, such a configuration is called an optical homodyne receiver. The carrier wave light can also be combined with the SSB optical signal in a transmitter and the resultant light can be transmitted therefrom. In this case, a standard direct detection receiver can be used as a receiver. However, in this case, it should be noted that homodyne detection reception is also performed. The frequency of the carrier wave light to be combined for the optical homodyne detection is equivalent to the carrier frequency of the SSB optical signal.

According to the foregoing methods, the SSB optical signal can be produced as mentioned above but undesirable components remain in the optical spectrum. Since, in the phasor diagram, the trace is not circular, that is to say, the distance from origin changes, it is understood that a residual intensity-modulated component exists.

SUMMARY OF THE INVENTION

Accordingly, the present invention is made to overcome the above-mentioned disadvantages and it is an object of the present invention to provide a method for generating a single-sideband optical signal, whereby an SSB optical signal having excellent narrowband properties can be generated with a relatively simple configuration without a 90-degree hybrid circuit, and further, an excess high frequency component can be substantially eliminated.

According to the present invention, as a basic method for generating a single-sideband optical signal, there is a method for generating a single-sideband optical signal, including the steps of: performing chirpless 0-$\pi$ optical phase modulation on carrier wave light in accordance with a required data signal in order to generate a single-sideband optical signal; passing the generated single-sideband optical signal through an optical filter; directly detecting the single-sideband optical signal using a photoreceiver; detecting the magnitude of a residual intensity-modulated component from an output signal of the photoreceiver; and either of the following two steps. In one step, the center frequency of the optical filter is controlled so that the amplitude of the residual intensity-modulated component is always minimized. In the other step, the oscillation frequency of the carrier wave light is controlled so that the amplitude of the residual intensity-modulated component is always minimized.

As mentioned above, when the SSB optical signal is passed through the optical filter, the undesirable residual intensity-modulated component can be suppressed. The center frequency of the optical filter or the carrier frequency is controlled so that the residual intensity-modulated component is minimized, whereby an ideal SSB optical signal can be obtained as will be described below.

According to the present invention, as a concrete method for generating a single-sideband optical-signal, there is provided a method for generating a single-sideband optical signal, including the steps of: splitting carrier wave light into first carrier wave light and second carrier wave light; performing chirpless 0-$\pi$ optical phase modulation on the first carrier wave light in accordance with a required data signal using a first optical phase modulator in order to generate first phase-modulated light; generating a bit-delay data signal having a delay corresponding to $\pi/2$ of a bit period of the required data signal inputted; performing chirpless 0-$\pi$ optical phase modulation on the second carrier wave light in accordance with the bit-delay data signal using a second optical phase modulator in order to generate second phase-modulated light; and combining the first phase-modulated light with the second phase-modulated light so that a phase difference between individual carrier waves thereof is set to 90 degrees.

According to the method, therefore, a 0.5-bit delay data signal is used as a bit-delay data signal for an NRZ data signal and 0.25-bit delay data signal is used for an RZ (Return to Zero) data signal.

That is, according to the present invention, a fixed delay circuit is used instead of a 90-degree hybrid circuit. Specifically, when a driving signal is the NRZ signal, a 0.5-bit delay circuit is used, and when the driving signal is the RZ signal, a 0.25-bit delay circuit is used. In the case of using the fixed delay circuit, when it is assumed that the amount of delay is set to τ only the ¼ τ, frequency component is shifted by 90 degrees (π/2) and the other frequency components are not shifted by 90 degrees. It is also possible to realize the narrow spectral bandwidth of the SSB optical signal generated by the above simple method.

Preferably, each of the first and second optical phase modulators comprises a chirpless Mach-Zehnder interferometer-type optical modulator. Preferably, each of the first and second optical phase modulators comprises a push-pull-driven Mach-Zehnder interferometer-type optical modulator in which electrodes on both arms are driven. The first optical phase modulator is driven in a push-pull manner in accordance with the data signal and the inverted data signal of the data signal in order to perform chirpless 0-π optical phase modulation in accordance with the required signals. The second optical phase modulator is driven in a push-pull manner in accordance with the bit-delay data signal and the bit-delay inverted data signal of the bit-delay data signal in order to perform chirpless 0-π optical phase modulation in accordance with the required signals.

As a circuit for embodying the above generating method according to the present invention, there is a circuit for generating a single-sideband optical signal. The circuit includes basically a single-sideband optical modulator. The single-sideband optical modulator includes a first Mach-Zehnder interferometer having second and third Mach-Zehnder interferometers integrated in two arms thereof, and combines individual output signals of the second and third Mach-Zehnder interferometers to generate a single-sideband optical signal, the output signals being generated by splitting input carrier wave light. And the present invention is characterized by the circuit further including a delay circuit for delaying a data signal supplied to the third Mach-Zehnder interferometer by 0.5 bit when a data signal supplied to the second Mach-Zehnder interferometer is an NRZ signal, or a delay circuit for delaying a data signal supplied to the third Mach-Zehnder interferometer by 0.25 bit when a data signal supplied to the second Mach-Zehnder interferometer is an RZ signal.

The above-mentioned generation circuit further includes an optical filter, a photoreceiver, a residual intensity-modulated component detector, and a controller, and controls so that the amplitude of a residual intensity-modulated component of an optical signal generated is always minimized.

BRIEF DESCRIPTION OF THE DRAWINGS

FIG. 3 is a diagram showing an example of a circuit of a conventional SSB optical signal generating section, in which an input data signal is set at 10 GHz;

FIGS. 4A to 4C illustrate phasor diagrams of an SSB optical signal generated in the SSB optical signal generating section shown in FIG. 3;

DESCRIPTION OF THE PREFERRED EMBODIMENTS

To describe the present invention in detail, the invention will now be explained with reference to the accompanying drawings.

Figure 6:
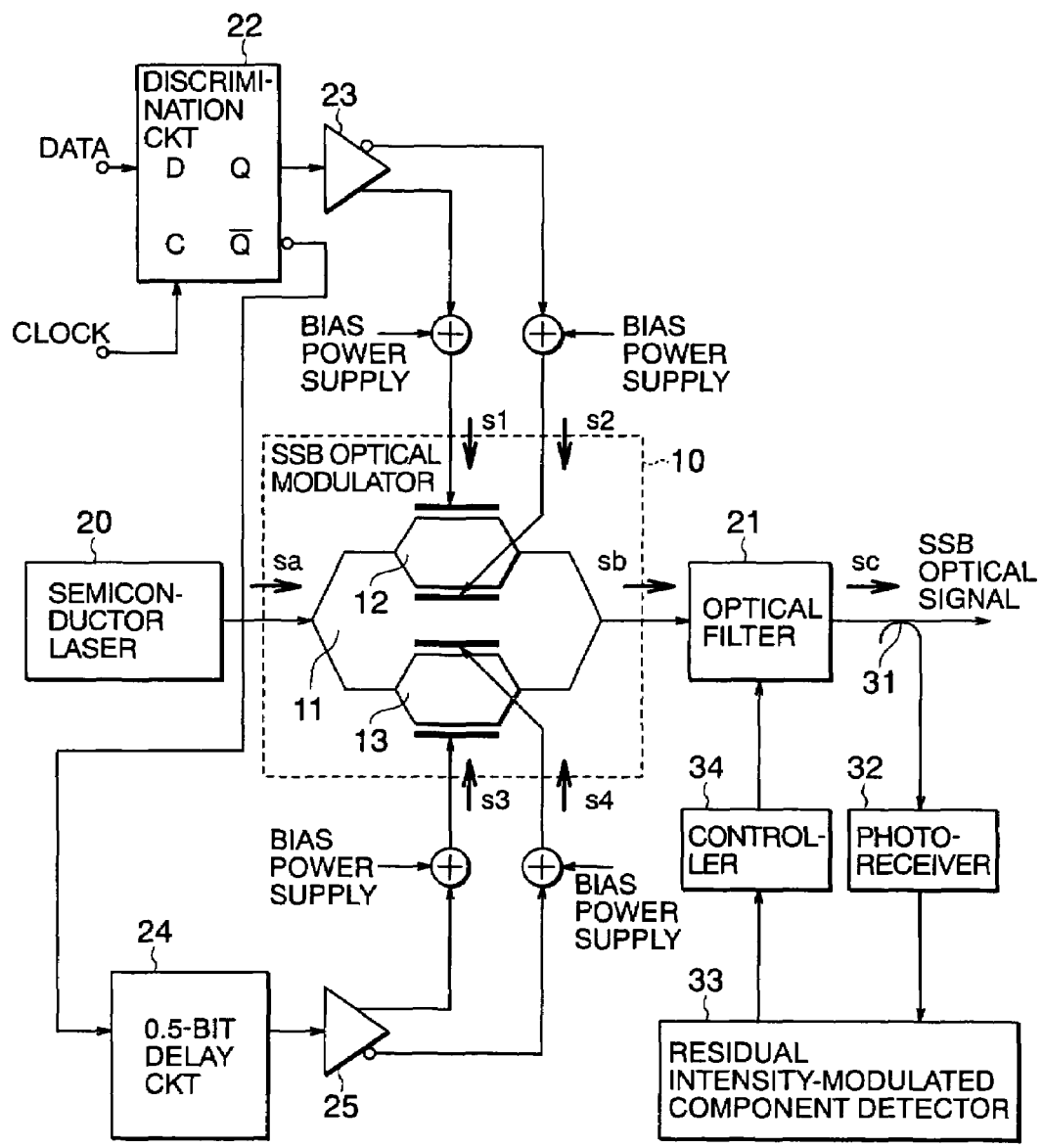
FIG. 6 is a diagram showing a circuit according to an embodiment of the present invention.
Figure 7A:
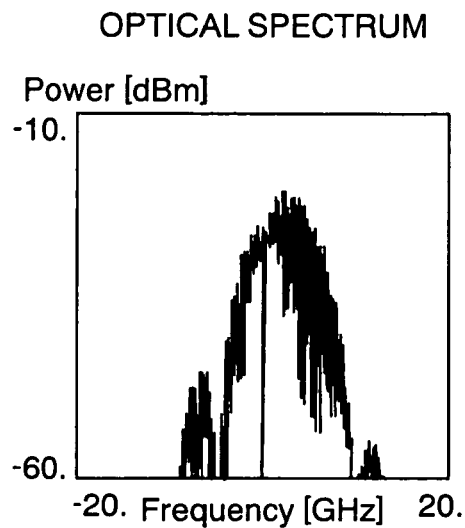
FIGS. 7A to 7D illustrate graphs showing an optical spectrum, a phasor diagram, a residual intensity-modulated component, and homodyne detection reception waveforms, each graph being obtained by letting an SSB optical signal generated by an optical modulator in FIG. 6 pass through an optical filter when the center frequency is set at +1.9 GHz.
Figure 7B:
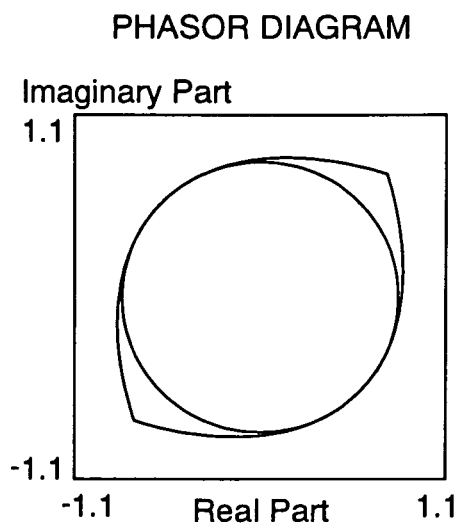
Figure 7C:
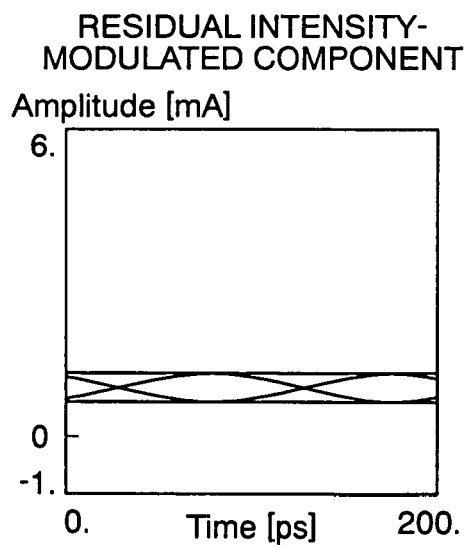
Figure 7D:
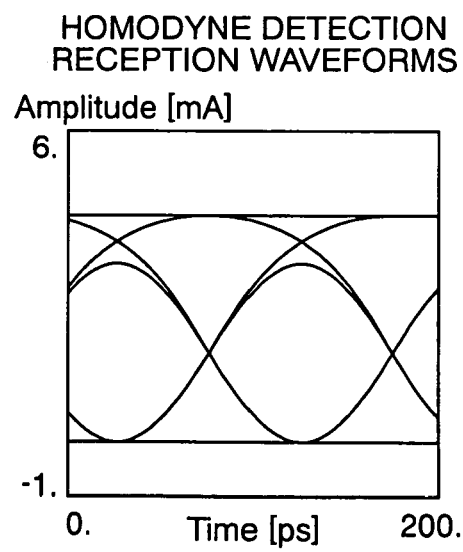
Figure 8A:
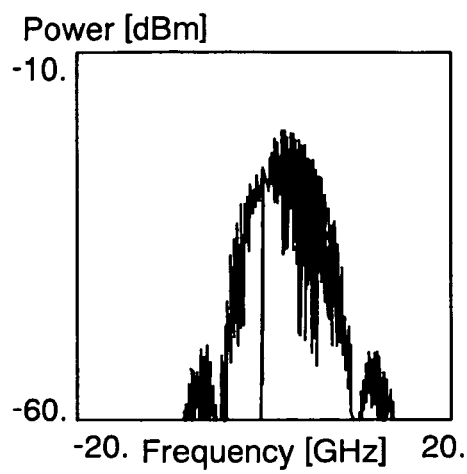
FIGS. 8A to 8D show graphs similar to those in FIGS. 7A to 7D when the center frequency is set at +4.4 GHz.
Figure 8B:
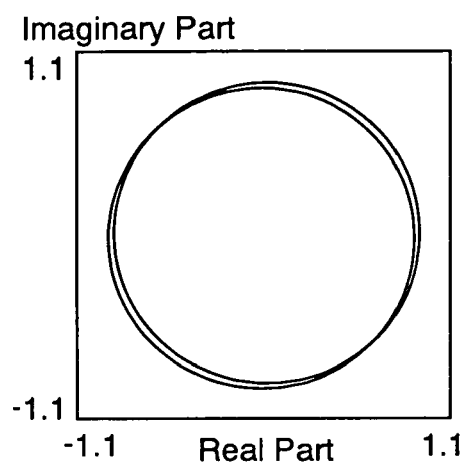
Figure 8C:
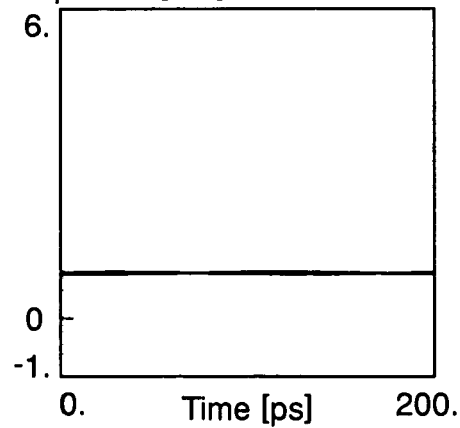
Figure 8D:
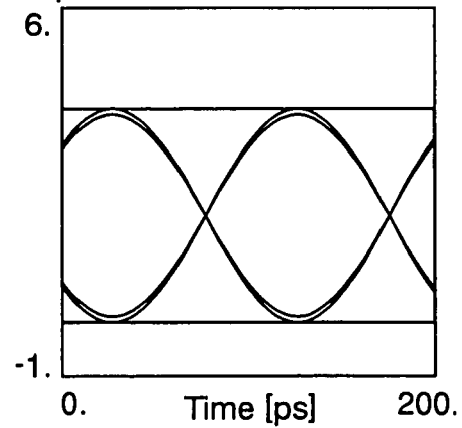
Figure 9A:
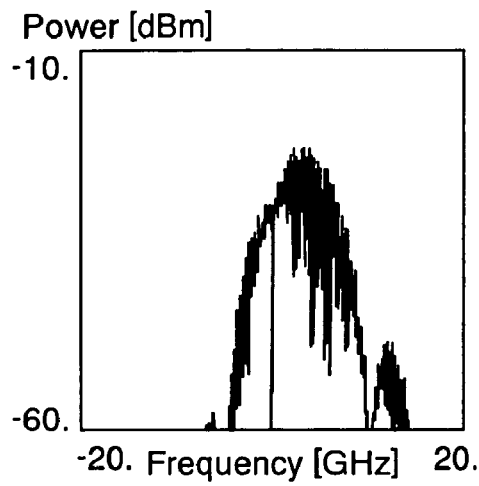
FIGS. 9A to 9D show graphs similar to those in FIGS. 7A to 7D when the center frequency is set at +6.9 GHz.
Figure 9B:
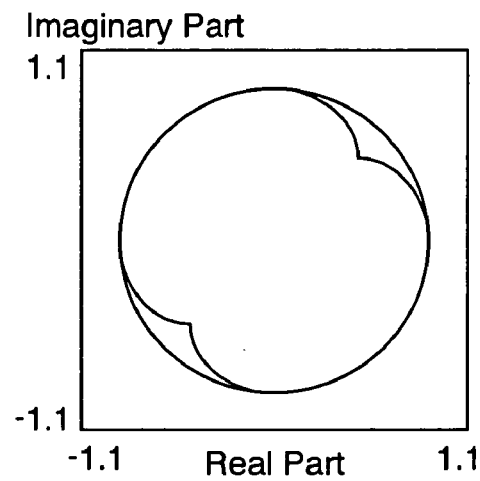
Figure 9C:
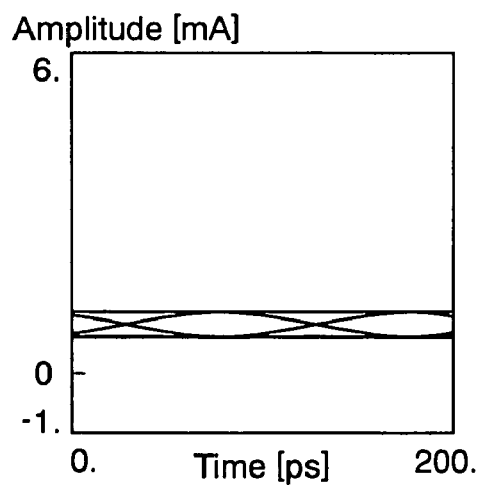
Figure 9D:
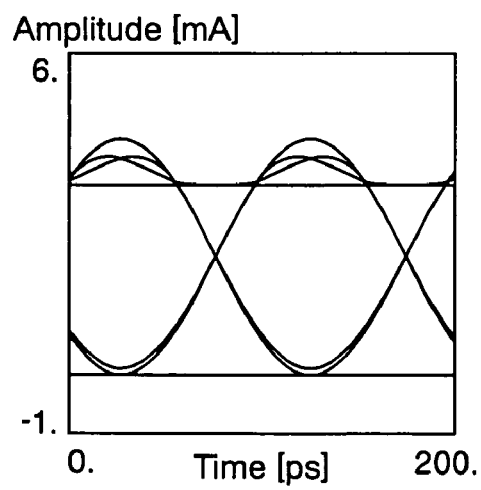

FIG. 6 is a diagram showing a circuit according to an embodiment of the present invention. In the circuit for generating a single-sideband optical signal shown in FIG. 6, a binary NRZ data signal is supplied to a transmitter having an SSB optical modulator 10 at a bit rate of 10 Gb/s. Carrier wave light Sa is generated from a semiconductor laser 20 having a wavelength of 1.55 μm. The light Sa is modulated by the SSB optical modulator 10 to obtain an SSB optical signal Sb. In this instance, the SSB optical modulator 10 includes the following components. Mach-Zehnder interferometers 12 and 13 for driving are integrated in both arms of a Mach-Zehnder interferometer 11 on a lithium niobate substrate. The lithium niobate substrate is used in the above-mentioned related art shown in FIG. 2.

Referring to FIG. 6, the transmitter further includes an optical filter 21, a discrimination circuit 22, complementary output amplifiers 23 and 25, a 0.5-bit delay circuit 24, an optical splitter 31, a photoreceiver 32, a residual intensity-modulated component detector 33, and a controller 34.

Figure 1:
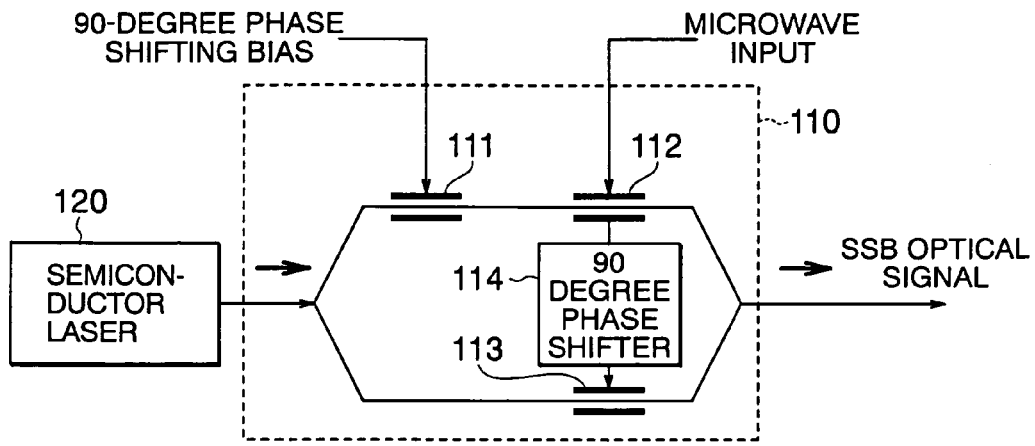
FIG. 1 is a diagram showing an example of a circuit according to the related art.
Figure 2:
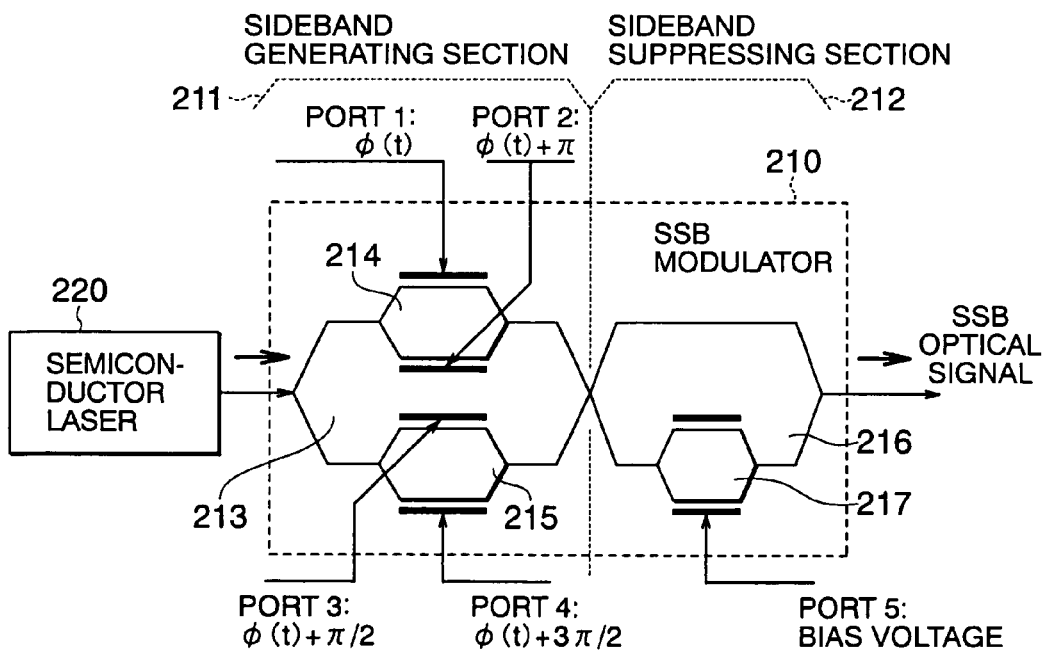
FIG. 2 is a diagram showing another example of a circuit according to the related art, different from that in FIG. 1.

The SSB optical modulator 10 has the same configuration as that of the sideband generating section in FIG. 2. Namely, the Mach-Zehnder interferometers 12 and 13 are integrated in the two arms of the Mach-Zehnder interferometer 11. In this instance, the SSB optical modulator 10 combines output signals of the Mach-Zehnder interferometers 12 and 13 generated by splitting the carrier wave light Sa outputted from the semiconductor laser 20, thereby generating the SSB optical signal Sb.

In other words, a data signal s1 and an inverted data signal s2 drive the Mach-Zehnder interferometer 12 in a push-pull manner. A 0.5-bit delay data signal s3 has a 90-degree (π/2) phase-shifted delay with respect to the data signal s1. The 0.5-bit delay data signal s3 and a 0.5-bit delay inverted data signal s4 drive the other Mach-Zehnder interferometer 13 in a push-pull manner. To obtain the driving signals, first, the discrimination circuit 22 discriminates and reproduces a data signal to be transmitted in accordance with the timing of a clock signal. Consequently, a pair of discriminated complementary data signals (data signal and inverted data signal) are obtained. Obtaining one pair of complementary data signal outputs in the discrimination circuit 22 functions to split the data signal.

One of the discriminated data signals is supplied to the complementary output amplifier 23. An adder applies an appropriate bias voltage from a bias power supply to each of the two outputs of the amplifier 23. Consequently, the data signal s1 and the inverted data signal s2 are produced.

The other discriminated inverted data signal is inputted to the complementary output amplifier 25 through the 0.5-bit delay circuit 24. An adder applies an appropriate bias voltage from a bias power supply to each of the two outputs of the complementary output amplifier 25. Consequently, the 0.5-bit delay data signal s3 and the 0.5-bit delay inverted data signal s4 are produced.

Figure 5A:
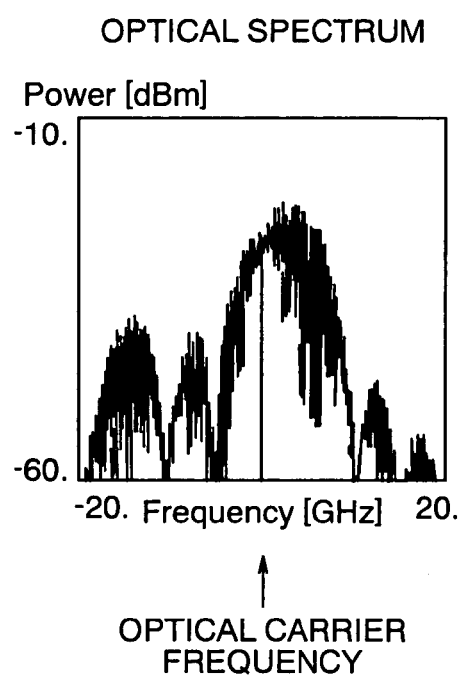
FIGS. 5A and 5B show graphs representing the optical spectrum and the homodyne detection reception waveforms of the SSB optical signal generated in the SSB optical signal generating section shown in FIG. 3.
Figure 5B:
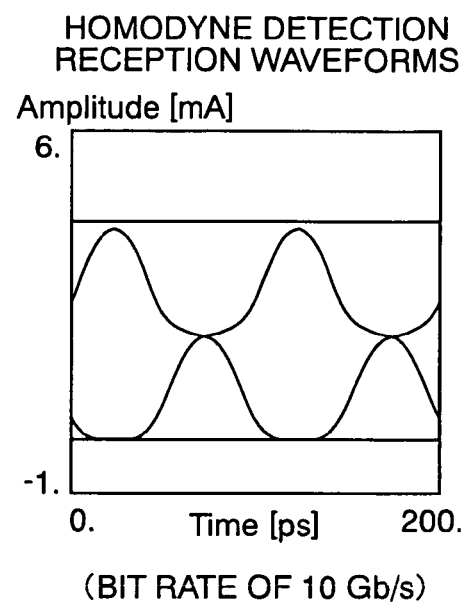

When the SSB optical modulator 10 is driven with the data signals produced as mentioned above, the SSB optical signal Sb having the optical spectrum shown in FIGS. 5A and 5B can be obtained.

In other words, since the 90-degree phase-shifted data signal is an NRZ signal, the signal simulates a phase delay of $\pi/2$ by using the 0.5-bit delay circuit.

As shown in FIGS. 5A and 5B, in this state, the optical spectrum includes undesirable components. In the phasor diagrams shown in FIGS. 4A to 4C, since each trace is not circular, the distance from origin changes. Therefore, it can be understood that a residual intensity-modulated component exists.

To eliminate the undesirable optical spectrum component, we examined that the SSB optical signal Sb generated by the SSB optical modulator 10 in FIG. 6 was allowed to pass through the optical filter 21. FIGS. 7 to 9 show results obtained by simulating the optical spectra, the phasor diagrams, the residual intensity-modulated components, and the homodyne detection reception waveforms for the above case.

We assumed a raised cosine filter as the optical filter 21 and set a 3-dB bandwidth at 12.5 GHz (0.1 nm). We calculated the carrier frequencies of optical signals when the center frequency of the optical filter 21 was set at +1.9 GHz in FIGS. 7A to 7D, when the center frequency thereof was set at +4.4 GHz in FIGS. 8A to 8D, and when the center frequency was set at +6.9 GHz in FIGS. 9A to 9D. From the results of the calculations, the following becomes apparent. In the optical filter 21, as shown in FIGS. 8A to 8D, the most suppressed residual intensity-modulated component is obtained and the phasor diagram exhibits a trace that is the closest to a circle when the center frequency is +4.4 GHz. In FIGS. 8A to 8D, the homodyne detection reception waveforms exhibit the minimum intersymbol interference and an eye diagram shows suitable openings.

Consequently, the following was verified. That is, when the center frequency of the optical filter is controlled so as to minimize the residual intensity-modulated component, an ideal SSB optical signal can be produced and suitable reception waveforms can be obtained. Instead of controlling the center frequency of the optical filter, the center frequency can be fixed to control the wavelength of the optical signal.

For this reason, in FIG. 6, the SSB optical signal Sb is allowed to pass through the optical filter 21. The output of the optical filter 21 is a band-limited SSB optical signal Sc. The optical splitter 31 splits the SSB optical signal Sc. One of the split outputs is sent as an output of the transmitter. The other output is inputted to the photoreceiver 32 to be subjected to direct detection reception. Consequently, an intensity-modulated component remaining in the SSB optical signal Sc is generated from the photoreceiver 32. The residual intensity-modulated component detector 33 detects the magnitude of the residual intensity-modulated component. The controller 34 controls the center frequency of the optical filter 21 so that the magnitude of the residual intensity-modulated component is always minimized. Due to the control, the SSB optical signal Sc has suitable narrowband properties and the residual intensity-modulated component is suppressed.

Regarding the SSB optical signal produced in the configuration described above, we measured the reception sensitivity characteristics for the SSB optical signal using a homodyne detection receiver. Consequently, the minimum reception sensitivity was equal to −35 dBm. This value compares favorably with that of a normal NRZ optical signal. We also evaluated the minimum frequency (wavelength) interval in high-density WDM transmission. It was found that a normal NRZ optical signal at 10 Gb/s can be multiplexed at an interval up to 25 GHz. On the other hand, the SSB optical signal generated according to the present invention can be multiplexed at an interval up to 15 GHz. Thus, the validity of the present invention is confirmed.

Another embodiment will now be described with reference to FIG. 10. In this embodiment, an output of an optical filter 41 is fed back to a semiconductor laser 40. The optical filter 41 is different from that in FIG. 6.

Figure 10:
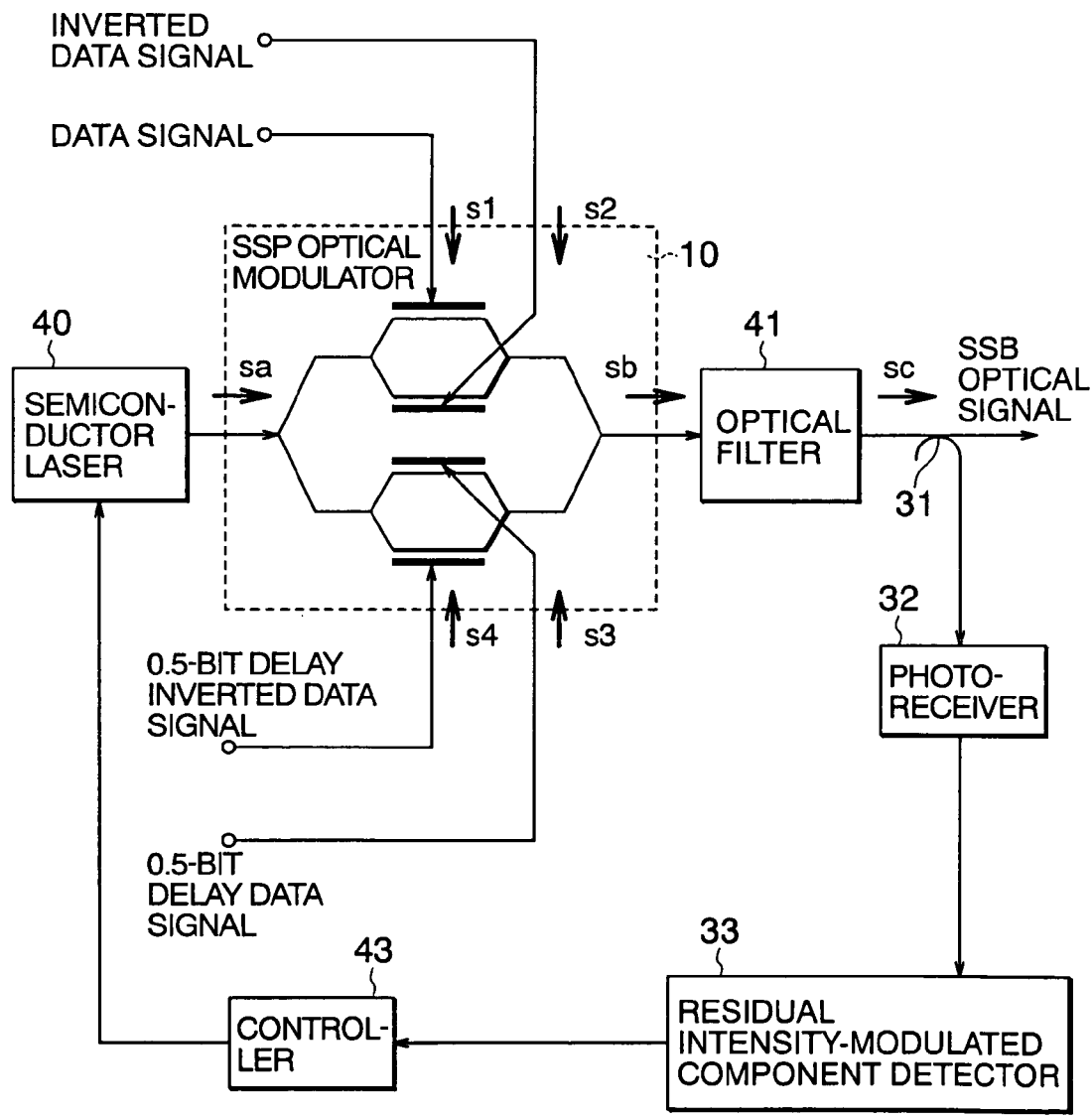
FIG. 10 is a diagram showing a circuit of another embodiment according to the present invention, which differs from that in FIG. 6.

Referring to FIG. 10, a controller 43 performs feedback on a supply current and temperature of the semiconductor laser 40 so that the residual intensity-modulated component is always minimized, whereby the frequency of the carrier wave light Sa is controlled. As shown in the diagram, the method for generating a data signal for driving the SSB optical modulator 10 is the same as that in FIG. 6. The optical splitter 31 splits the SSB optical signal Sc. The split-off output is inputted to the photoreceiver 32 to be directly detected. The photoreceiver 32 outputs the intensity-modulated component which remains in the SSB optical signal Sc. The residual intensity-modulated component detector 33 detects the magnitude of the residual intensity-modulated component. The result is transmitted to the controller 43. The SSB optical signal Sc generated in the above configuration has the same reception sensitivity characteristics and the same minimum frequency interval characteristics as those in the configuration shown in FIG. 6.

Figure 11:
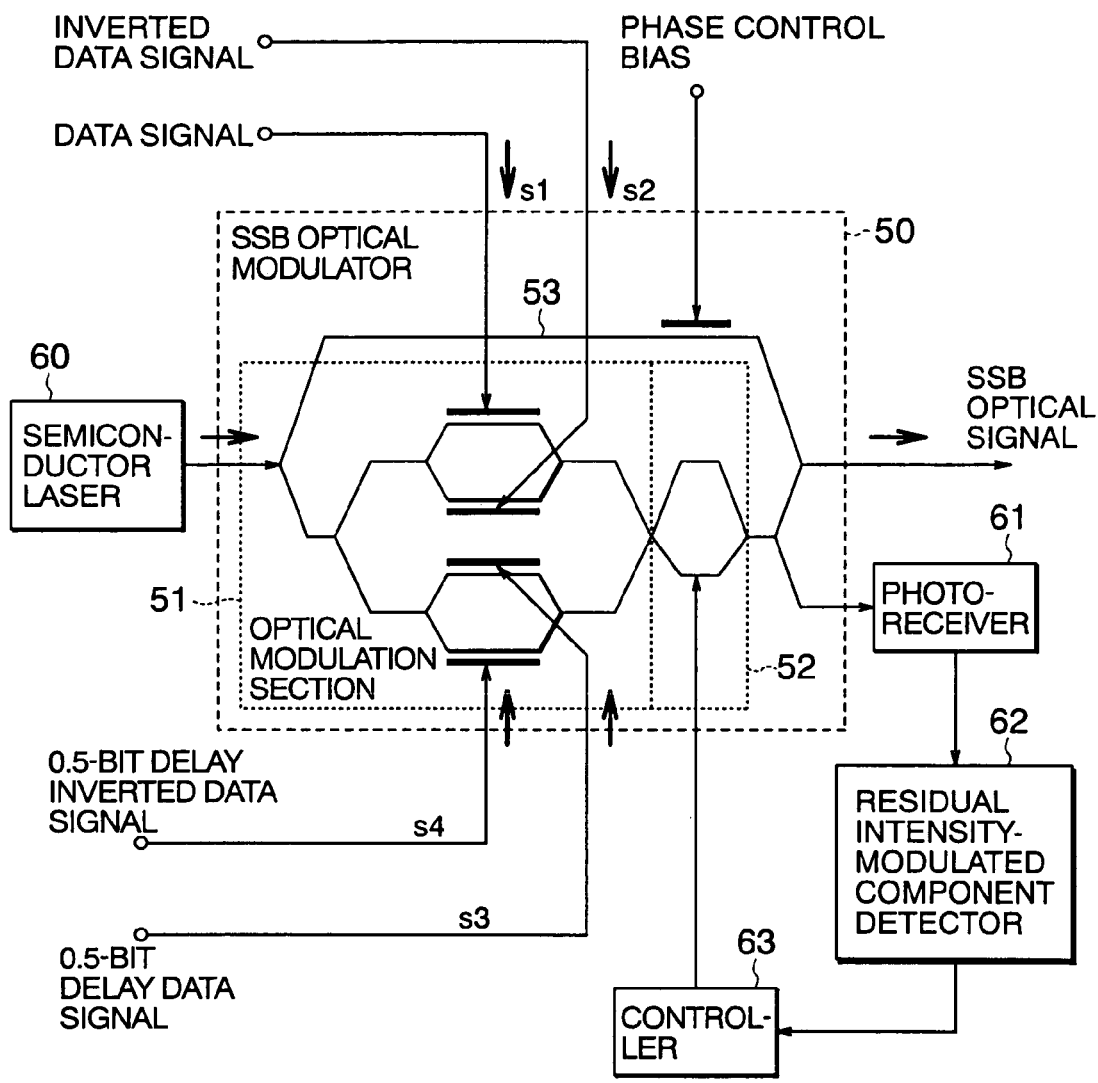
FIG. 11 is a diagram showing the circuit of another embodiment according to the present invention, which differs from those in FIGS. 6 and 10.

Another embodiment of the present invention will now be described with reference to FIG. 11. In this embodiment, an optical filter is mounted on a lithium niobate substrate constructing an SSB optical modulator 50.

The SSB optical modulator 50 includes an optical modulating section 51, an optical filter section 52, and a local oscillation optical path 53. As a feedback circuit, the modulator 50 further includes a photoreceiver 61, a residual intensity-modulated component detector 62, and a controller 63.

Since the optical modulating section 51 is the same as the above-mentioned SSB optical modulator 10, the description is omitted. The optical filter section 52 comprises an asymmetrical Mach-Zehnder interferometer. When an electric field is applied to an electrode on the arm of the optical filter section 52, the center frequency can be controlled. The photoreceiver 61 receives an output of the optical filter section 52. The controller 63 receives the residual intensity-modulated component through the residual intensity-modulated component detector 62. According to the receiving component, the controller 63 controls the electric field on the electrode of the optical filter section 52 to exhibit the above-mentioned function.

The local oscillation optical path 53 is an optical guide path to split off the carrier wave light Sa as local oscillation light necessary for homodyne detection reception, The local oscillation optical path 53 applies a phase control bias from the electrode to the split-off carrier wave light Sa to appropriately adjust the optical phase. The local oscillation optical path 53 combines the adjusted light Sa with the SSB optical signal generated by the optical filter section 52 on the output side and then generates the resultant light. Accordingly, a standard direct detection receiver can be used on the reception side. Consequently, it is possible to realize a reduction in size and cost of the overall system.

In the above description, the NRZ signal is used as a data signal for driving the Mach-Zehnder interferometer. In the case of an RZ signal, when a 0.25-bit delay is added by the bit delay circuit for adding a phase difference of $\pi/2$, the same advantages can be achieved.

Another embodiment of the present invention will now be described with reference to FIG. 12. In the present embodiment, an RZ data signal and an X-cut lithium niobate substrate are used.

Figure 12:
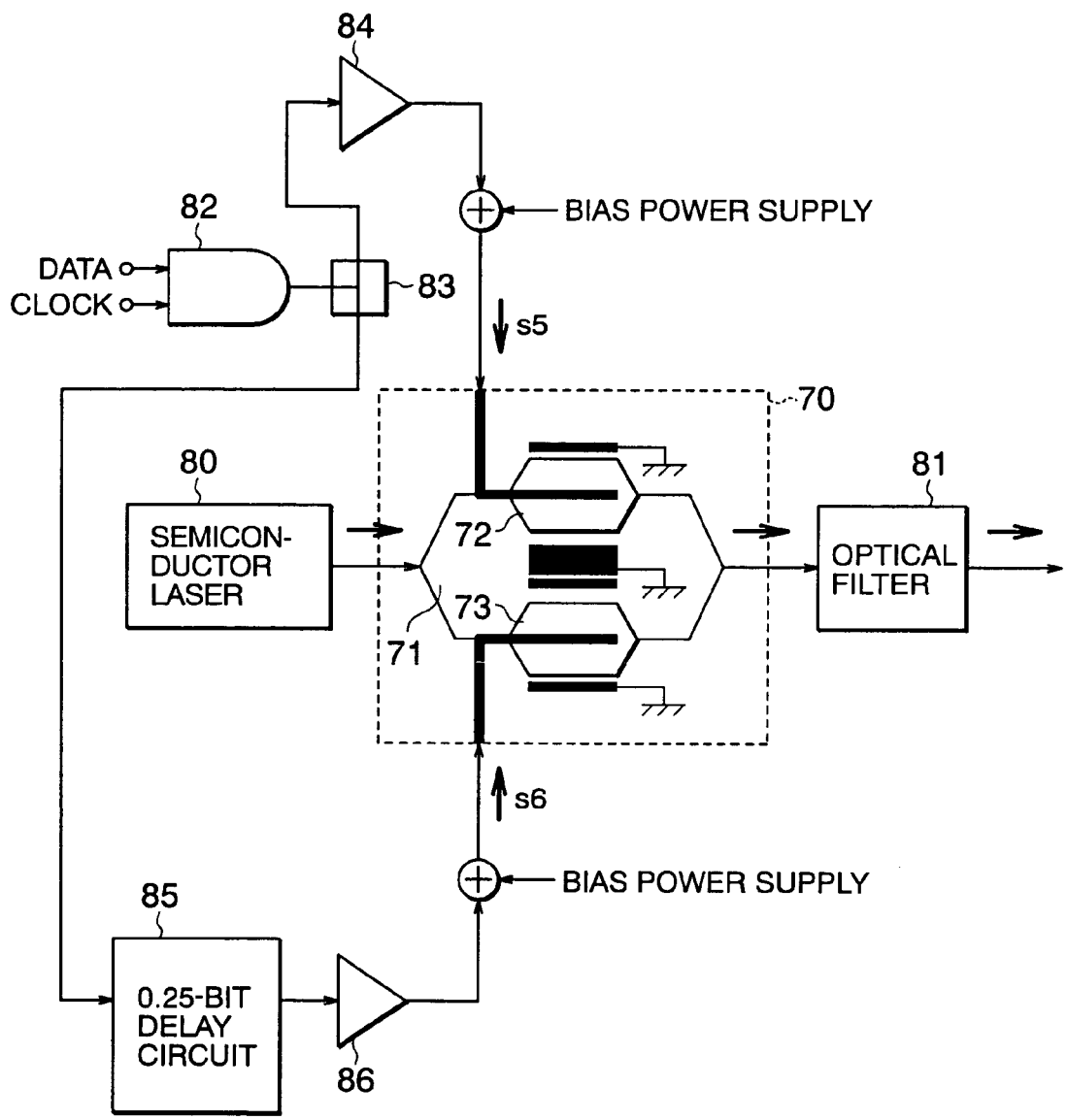
FIG. 12 is a diagram showing the circuit of another embodiment according to the present invention, which differs from those in FIGS. 6, 10, and 11.

Referring to FIG. 12, an SSB optical modulator 70 includes a Mach-Zehnder interferometer 71 on the X-cut lithium niobate substrate. Mach-Zehnder interferometers 72 and 73 for driving are integrated in both arms of the Mach-Zehnder interferometer 71. Carrier wave light is supplied from a semiconductor layer 80 to the SSB optical modulator 70. A produced SSB optical signal is generated through an optical filter 81.

A data signal including an NRZ code and a clock signal are supplied to an RZ code converter 82, so that the RZ data signal is obtained as an output thereof. A splitter 83 splits the RZ data signal. An amplifier 84 appropriately amplifies one of the split-off RZ data signals. A bias voltage is applied to the amplified signal to generate an RZ data signal s5. The other RZ data signal is supplied through a 0.25-bit delay circuit 85 and is then appropriately amplified by an amplifier 86. A bias voltage is applied to the resultant signal to obtain a 0.25-bit delay RZ data signal s6. In the case of an RZ data signal whose pulse duty ratio is 50%, the optimum delay is 0.25 bit.

As mentioned above, the SSB optical modulator 70 is fabricated using the X-cut lithium niobate substrate. Accordingly, using the X-cut substrate can realize chirpless phase modulation due to single electrode driving. Consequently, since only one driving signal is supplied to each Mach-Zehnder interferometer, the system can be simplified. The X-cut substrate can be effectively used not only for an RZ code but also for an NRZ code and other codes.

Figure 13A:
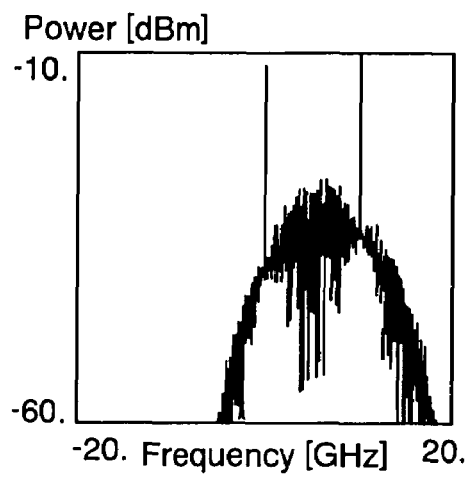
FIGS. 13A to 13C illustrates graphs showing the optical spectrum, the phasor diagram, and the homodyne detection reception waveforms of an SSB optical signal passing through an optical filter in FIG. 12.
Figure 13B:
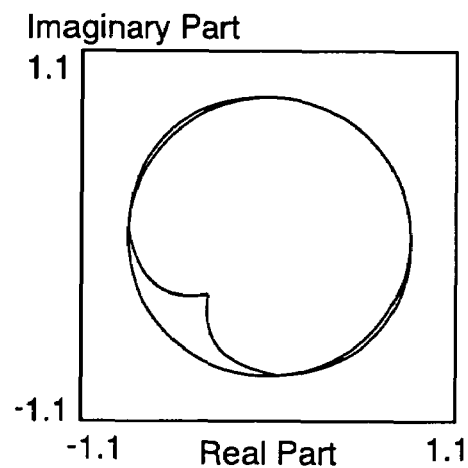
Figure 13C:
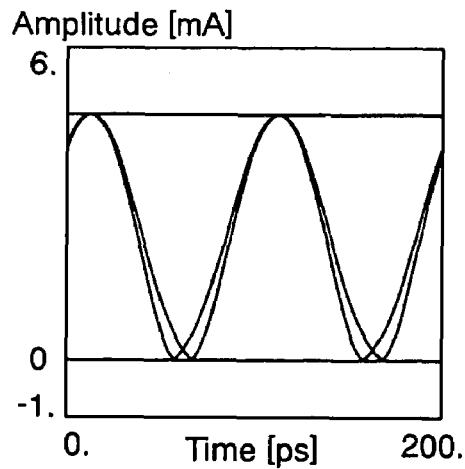

FIGS. 13A to 13C shows the optical spectrum, the phasor diagram, and the homodyne detection reception waveforms of an SSB optical signal obtained with the RZ data signal shown in FIG. 12. It is understood that the homodyne detection results in the completely demodulated RZ data signal.

Although the embodiments of the present invention have been described, the present invention is not limited to those configurations, and various modifications are possible.

The wavelength of the optical signal is not limited to 1.55 $\mu$m used in regular optical communication. Any wavelength can be used.

The results obtained using a bit rate of 10 Gb/s have been described above. However, the bit rate is not limited to this value. The bit rate can be higher or lower than the above value. The present invention can also be applied to WDM optical communication.

An NRZ signal and an RZ signal have been used as data signals in the above description. However, the data signal is not limited to them and any code sequence, such as duobinary codes, can be used.

The 0.5-bit delay circuit or 0.25-bit delay circuit can be disposed for either of the two split data signals. The relative amount of delay can be set to 0.5 bit or 0.25 bit. The 90-degree optical phase shifting operation can be applied to either arm of the Mach-Zehnder interferometer as long as the relative optical phase difference between both arms is equal to 90 degrees when the optical signals are combined.

In the above description, the SSB optical modulator is fabricated using the lithium niobate substrate. It is possible to use any material such as an optical semiconductor substrate, a substrate made of an organic material, or a quartz substrate which can realize an optical modulator.

It is not necessary that the driving amplitude always matches the half-wavelength voltage (V $\pi$). For example, when modulation is performed with a driving amplitude smaller than the voltage V $\pi$, the non-linearity of the Mach-Zehnder modulator is reduced and the optical spectrum also becomes narrower.

One method for controlling an optical filter is the following method. According to the method, the center frequency of the optical filter is subjected to micro-modulation through a sine wave signal and the optimum point is searched for using synchronous detection. Any control method can be used as long as the center frequency can be controlled to the minimum value, in the same way as in a hill-climbing method, which is used as a minimum value (or maximum value) control method.

As mentioned above, according to the present invention, bit delay is performed only with a bit period of $\pi/2$, whereby a 90-degree phase difference is simply and easily obtained. Consequently, an SSB optical signal having excellent narrowband properties can be generated without a 90-degree hybrid circuit. When the optical filter is used for the SSB optical signal to be generated, the output is fed back to control the optical filter or the carrier frequency so that the magnitude of the residual intensity-modulated component is always minimized. Consequently, it is possible to eliminate excess high-frequency components remaining due to the non-linearity caused by the voltage versus optical output sinusoidal characteristics of the Mach-Zehnder interferometer. Moreover, a 90-degree phase difference can be obtained by the bit delay circuit. Local oscillation light necessary for homodyne detection reception is combined in order to realize a reduction in overall size and cost. The X-cut substrate is used to reduce the number of driving signals by half. Consequently, the system configuration can be simplified.

What is claimed is:

1. A method for generating a single-sideband optical signal, comprising the steps of:
performing chirpless 0-$\pi$ optical phase modulation on carrier wave light in accordance with a required data signal in order to generate a single-sideband optical signal;
passing the generated single-sideband optical signal through an optical filter;
directly detecting the single-sideband optical signal using a photoreceiver;

detecting the magnitude of a residual intensity-modulated component from an output signal of the photoreceiver; and controlling the center frequency of the optical filter so that the magnitude of the residual intensity-modulated component is always minimized.

2. A method for generating a single-sideband optical signal, comprising the steps of:

performing chirpless 0-π optical phase modulation on carrier wave light in accordance with a required data signal in order to generate a single-sideband optical signal;

passing the generated single-sideband optical signal through an optical filter;

directly detecting the single-sideband optical signal using a photoreceiver;

detecting the magnitude of a residual intensity-modulated component from an output signal of the photoreceiver; and controlling the oscillation frequency of the carrier wave light so that the magnitude of the residual intensity-modulated component is always minimized.

3. A method for generating a single-sideband optical signal, comprising the steps of:

splitting carrier wave light into first carrier wave light and second carrier wave light;

performing chirpless 0-π optical phase modulation on the first carrier wave light in accordance with a required data signal using a first optical phase modulator in order to generate first phase-modulated light;

generating a bit-delay data signal having a delay corresponding to π/2 of a bit period of the required data signal inputted;

performing chirpless 0-π optical phase modulation on the second carrier wave light in accordance with the bit-delay data signal using a second optical phase modulator in order to generate second phase-modulated light; and combining the first phase-modulated light with the second phase-modulated light so that a phase difference between individual carrier waves thereof is set to 90 degrees in order to generate a single-sideband optical signal.

4. A method according to claim 3, wherein each of the first and second optical phase modulators comprises a chirpless Mach-Zehnder interferometer-type optical modulator.

5. A method according to claim 3, wherein, each of the first and second optical phase modulators comprises a push-pull-driven Mach-Zehnder interferometer-type optical modulator in which electrodes on both arms are driven;

the first optical phase modulator is push-pull driven in accordance with the data signal and the inverted data signal of the data signal in order to perform chirpless 0-π optical phase modulation in accordance with the required signals; and the second optical phase modulator is push-pull driven in accordance with the bit-delay data signal and the bit-delay inverted data signal of the bit-delay data signal in order to perform chirpless 0-π optical phase modulation in accordance with the required signals.

6. A method according to claim 3, wherein the carrier wave light has the same frequency as the carrier frequency of the generated single-sideband optical signal, is combined with the single-sideband optical signal, and the resultant light is then transmitted.

7. A circuit for generating a single-sideband optical signal, comprising:

a single-sideband optical modulator comprising a first Mach-Zehnder interferometer having second and third Mach-Zehnder interferometers integrated in two arms thereof, the single-sideband optical modulator combining individual output signals of the second and third Mach-Zehnder interferometers to generate a single-sideband optical signal, the output signals being generated by splitting input carrier wave light;

a delay circuit for delaying a data signal supplied to the third Mach-Zehnder interferometer by appropriate bit rate in accordance with a data signal supplied to the second Mach-Zehnder interferometer.

8. A circuit according to claim 7, wherein the appropriate bit rate is 0.5 bit for the data signal of NRZ.

9. A circuit according to claim 7, wherein the appropriate bit rate is 0.25 bit for the data signal of RZ.

10. A circuit according to claim 7, further comprising;

an optical filter, through which the single-sideband optical signal supplied from the single-sideband optical modulator is allowed to pass, for performing band limitation;

an optical splitter for splitting an output of the optical filter;

a photoreceiver for directly detecting one split-off optical signal and then transmitting the optical signal;

a residual intensity-modulated component detector for detecting the magnitude of an intensity-modulated component remaining in the optical signal supplied from the photoreceiver and then outputting the magnitude; and a controller for controlling the frequency of the input carrier wave light so that the detected magnitude of the residual intensity-modulated component is always minimized.

11. A circuit according to claim 7, further comprising:

an optical filter, through which the single-sideband optical signal supplied from the single-sideband optical modulator is allowed to pass, for performing band limitation;

an optical splitter for splitting an output of the optical filter;

a photoreceiver for directly detecting one split-off optical signal and then transmitting the optical signal;

a residual intensity-modulated component detector for detecting the magnitude of an intensity-modulated component remaining in the optical signal supplied from the photoreceiver and then outputting the magnitude; and a controller for controlling the center frequency of the optical filter so that the detected magnitude of the residual intensity-modulated component is always minimized.

12. A circuit according to claim 7, further comprising:

an optical filter, through which the single-sideband optical signal supplied from the single-sideband optical modulator is allowed to pass, for performing band limitation;

an optical splitter for splitting an output of the optical filter;

a photoreceiver for directly detecting one split-off optical signal and then transmitting the optical signal;

a residual intensity-modulated component detector for detecting the magnitude of an intensity-modulated component remaining in the optical signal supplied from the photoreceiver and then outputting the magnitude; and a controller for controlling the center frequency of the optical filter so that the detected magnitude of the residual intensity-modulated component is always minimized, wherein, the optical filter comprises an asymmetrical Mach-Zehnder interferometer and functions as an optical filter section for controlling the center frequency of the single-sideband optical signal supplied from the single-sideband optical modulator by receiving an electric field on an electrode on one arm; and the controller controls the electric field applied to the electrode of the optical filter section so that the detected magnitude of the residual intensity-modulated component is always minimized, thereby controlling the center frequency.

13. A circuit according to claim 7, further comprising:

an optical filter, through which the single-sideband optical signal supplied from the single-sideband optical modulator is allowed to pass, for performing band limitation;

an optical splitter for splitting an output of the optical filter;

a photoreceiver for directly detecting one split-off optical signal and then transmitting the optical signal;

a residual intensity-modulated component detector for detecting the magnitude of an intensity-modulated component remaining in the optical signal supplied from the photoreceiver and then outputting the magnitude;

a controller for controlling the frequency of the input carrier wave light so that the detected magnitude of the residual intensity-modulated component is always minimized; and a local oscillation optical path, which serves as an optical guide path splitting the input carrier wave light, having a phase control electrode for applying a phase control bias from the electrode to the split-off carrier wave light to appropriately adjust the optical phase of the carrier wave light and then combine the adjusted carrier wave light with the optical signal transmitted from the optical filter on the output side.

14. A circuit according to claim 7, further comprising:

an optical filter, through which the single-sideband optical signal supplied from the single-sideband optical modulator is allowed to pass, for performing band limitation;

an optical splitter for splitting an output of the optical filter;

a photoreceiver for directly detecting one split-off optical signal and then transmitting the optical signal;

a residual intensity-modulated component detector for detecting the magnitude of an intensity-modulated component remaining in the optical signal supplied from the photoreceiver and then outputting the magnitude;

a controller for controlling the center frequency of the optical filter so that the detected magnitude of the residual intensity-modulated component is always minimized; and a local oscillation optical path, which serves as an optical guide path splitting the input carrier wave light, having a phase control electrode for applying a phase control bias from the electrode to the split-off carrier wave light to appropriately adjust the optical phase of the carrier wave light and then combine the adjusted carrier wave light with the optical signal transmitted from the optical filter on the output side.

* * * * *